(12) United States Patent
Guedalia et al.

(10) Patent No.: US 7,043,538 B2
(45) Date of Patent: May 9, 2006

(54) THIN INSTANT MESSAGING PROXY INTERFACE WITH PERSISTENT SESSIONS

(75) Inventors: David Guedalia, Beit Shemesh (IL); Gavriel Raanan, Beit Shemesh (IL); Lawrence Reisler, Beit Shemesh (IL)

(73) Assignee: NMS Communication Corporation, Framingham, MA (US)

( * ) Notice: Subject to any disclaimer, the term of this patent is extended or adjusted under 35 U.S.C. 154(b) by 724 days.

(21) Appl. No.: 09/897,735

(22) Filed: Jul. 2, 2001

(65) Prior Publication Data
US 2002/0062345 A1     May 23, 2002

Related U.S. Application Data

(60) Provisional application No. 60/216,424, filed on Jul. 6, 2000.

(51) Int. Cl.
  G06F 15/177  (2006.01)
  G06F 15/16   (2006.01)
  G06F 15/173  (2006.01)

(52) U.S. Cl. ............ 709/220; 709/227; 709/230; 709/231; 709/232; 709/238; 455/412; 455/414; 455/466

(58) Field of Classification Search ........... 709/220, 709/227, 230, 231, 232, 238; 455/466, 412, 455/414
See application file for complete search history.

(56) References Cited

U.S. PATENT DOCUMENTS

| | | | |
|---|---|---|---|
| 5,911,123 A * | 6/1999 | Shaffer et al. ........... | 455/554.1 |
| 6,219,694 B1 | 4/2001 | Lazaridis et al. | |
| 6,301,609 B1 * | 10/2001 | Aravamudan et al. ....... | 709/207 |
| 6,507,589 B1 * | 1/2003 | Ramasubramani et al. . | 370/465 |
| 6,714,793 B1 * | 3/2004 | Carey et al. ................ | 455/466 |
| 6,747,970 B1 * | 6/2004 | Lamb et al. ................ | 370/352 |
| 2002/0006803 A1 * | 1/2002 | Mendiola et al. .......... | 455/466 |
| 2002/0101446 A1 * | 8/2002 | Tang et al. ................. | 345/751 |
| 2002/0126135 A1 * | 9/2002 | Ball et al. .................. | 345/600 |
| 2002/0131399 A1 * | 9/2002 | Philonenko ................ | 370/351 |

OTHER PUBLICATIONS

Victor W. Zue "Navigating the Information Superhighway Using Spoken Language Interfaces", IEEE Expert, Oct. 1995, pp. 39-43.

(Continued)

*Primary Examiner*—Kim Huynh
*Assistant Examiner*—Angel L. Casiano
(74) *Attorney, Agent, or Firm*—Chapin & Huang, L.L.C.; Barry W. Chapin, Esq.

(57) ABSTRACT

Via a thin client, a first user communicates with a presence server and establishes a communication channel with a second user through the presence server. The communication channel supports instant messaging in which the first user communicates via use of a first communication protocol and the second user communicates via use of a second communication protocol. When the thin client temporarily disconnects from the presence server, the presence server maintains an active "open" session for the thin client even though the thin client is disconnected from the presence server. The thin client can reconnect to the presence server and re-establish communications over the open session, enabling the first user to again instant message the second user.

4 Claims, 3 Drawing Sheets

OTHER PUBLICATIONS

Matthew Lennig, "Putting Speech Recognition to Work in the Telephone Network", IEEE Institute of Electrical and Electronic Engineers, Aug. 1990, pp. 35-41.

Frank Stajano, et al., "The Thinnest of Clients: Controlling It All Via Cellphone", Mobile Computing and Communications Review, vol. 2, No. 4, Oct. 1998.

* cited by examiner

THIN INSTANT MESSAGING PROXY INTERFACE WITH PERSISTENT SESSIONS

FIELD OF THE INVENTION

The present invention relates to a thin instant messaging proxy interface.

BACKGROUND OF THE INVENTION

One of the most widely used applications on the Internet and a popular means of communication is Instant Messaging (IM). IM has exploded in popularity in the past few years as an alternative to e-mail. It is a quick and efficient way of maintaining regular contact and communicating on a worldwide scale, both for business and personal use.

An instant message is similar to an e-mail message in that it is transmitted via the Internet and may contain formatted or unformatted text. IM differs from ordinary e-mail in the immediacy of the message transmission. The immediacy of the message transmission enables a real time exchange of messages.

IM enables a user to ascertain whether a friend or coworker is connected to the Internet and whether such a person is available for a messaging 'session'.

There are presently a large number of protocols available for IM, such as AOL's AIM®, AOL's ICQ® and Microsoft's MSN®. Normally all IM software used in a given messaging session must communicate through the same protocol.

IM applications generally operate in one of two modes: peer-to-peer or client-server. In the peer-to-peer mode, the communicating clients send data directly to each other, without the involvement of an intermediate server. In the client-server mode, the communicating clients send data to each other via a central messaging server.

Typically, once an IM user has provided necessary login information to the client software, the client will begin monitoring previously specified addresses, often known as a BUDDY LIST®. The client may monitor the BUDDY LIST® directly or refer the task to a server. The BUDDY LIST® may be updated in real time, as buddies sign on and sign off. The BUDDY LIST® may be stored on a messaging server, or kept directly by the IM user for peer-to-peer usage.

IM is particularly popular on platforms that can support the client software and messaging protocols. However, thin clients, such as telephones and WAP-enabled cell phones, typically cannot support the client software and messaging protocols required for IM.

Furthermore, thin clients may have difficulty maintaining session information. This is particularly evident on WAP-enabled cell phones on which each WAP request may be communicated on a different WAP server.

The ability to remain actively involved in a session, while being physically remote is discussed in U.S. Pat. No. 5,889,845 that describes a virtual presence server by which remote users can connect to their offices and various forms of communication, such as fixes, e-mails and telephone calls can be routed to the remote users.

SUMMARY OF THE INVENTION

This invention seeks to provide a system and methodology to enable a thin client, without access to IM software, to utilize a presence server through a simple interface.

There is thus provided in accordance with a preferred embodiment of the present invention a method for instant messaging. The method includes enabling a thin client to employ a presence server for initiating a communications channel between at least first and second instant messaging users and conducting instant messaging along the communications channel between the instant messaging users.

Further in accordance with a preferred embodiment of the present invention the presence server is employed to simplify client-side connection negotiations to initiate the communications channel.

Still further in accordance with a preferred embodiment of the present invention the method also includes employing an instant messaging session object to enable non-persistent clients to maintain a session along the communications channel.

Preferably, the method also includes employing an instant messaging session object to enable non-persistent clients to maintain a session along the communications channel.

Additionally in accordance with a preferred embodiment of the present invention the enabling step includes redirecting at least one client to at least one previously opened session on at least one presence server.

Further in accordance with a preferred embodiment of the present invention the conducting step employs a first communication protocol between the first user and the presence server and employs a second communication protocol, different from the first communication protocol, between the presence server and the second user.

There is also provided in accordance with another preferred embodiment of the present invention a system for instant messaging. The system includes at least first and second communication devices and a presence server operative to initiate a communications channel between at least first and second instant messaging users via the first and second communication devices, at least one of which employs a thin client.

Further in accordance with a preferred embodiment of the present invention the presence server is operative to simplify client-side connection negotiations to initiate the communications channel.

Preferably, the presence server includes an instant messaging session object operative to enable non-persistent clients to maintain a session along the communications channel.

Additionally in accordance with a preferred embodiment of the present invention the presence server includes an instant messaging session object operative to enable non-persistent clients to maintain a session along the communications channel.

Still further in accordance with a preferred embodiment of the present invention the system for instant messaging includes a first and second communication protocols enabling communication between the presence server and the first and second communication devices.

Preferably, the first communication protocol supports redirecting at least one client to at least one previously opened session on at least one presence server.

Further in accordance with a preferred embodiment of the present invention the first communication protocol supports redirecting at least one client to at least one previously opened session on at least one presence server.

Preferably, the first and second communication protocols are different from each other.

Still further in accordance with a preferred embodiment of the present invention the communication devices include a thin client selected from the group consisting of a WAP client, a WML client, an HTML client or an HDML client.

Moreover in accordance with a preferred embodiment of the present invention the presence server includes at least one session object storing session information.

Further in accordance with a preferred embodiment of the present invention the system also includes an audio file server associated with the presence server.

Still further in accordance with a preferred embodiment of the present invention the system also includes an IVR operative to interface between a telephone and the presence server.

Additionally in accordance with a preferred embodiment of the present invention the system also includes an account information server for validating user access to the presence server.

Preferably, the presence server includes a client interface interfacing with the IVR.

Preferably, the presence server includes a message cache.

Further in accordance with a preferred embodiment of the present invention the system also includes an HTTP/WAP server through which a web user may be connected to the presence server.

Preferably, the system also includes an external server enabling communication between the presence server and an instant messaging service.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present invention provides a system and methodology to enable a thin client without access to IM software, to utilize a presence server through a simple interface.

In a preferred embodiment of the present invention, the client may utilize the presence server to simplify the client-side connection negotiations to initiate a communications channel between IM users.

Additionally, the present invention enables non-persistent socket clients, such as HTTP/1.0 clients, to maintain a session through the use of an IM Session Object.

Moreover, to enable the system to scale to a large number of concurrent users, the present invention may redirect clients to previously opened sessions on various presence servers.

Figure 1:
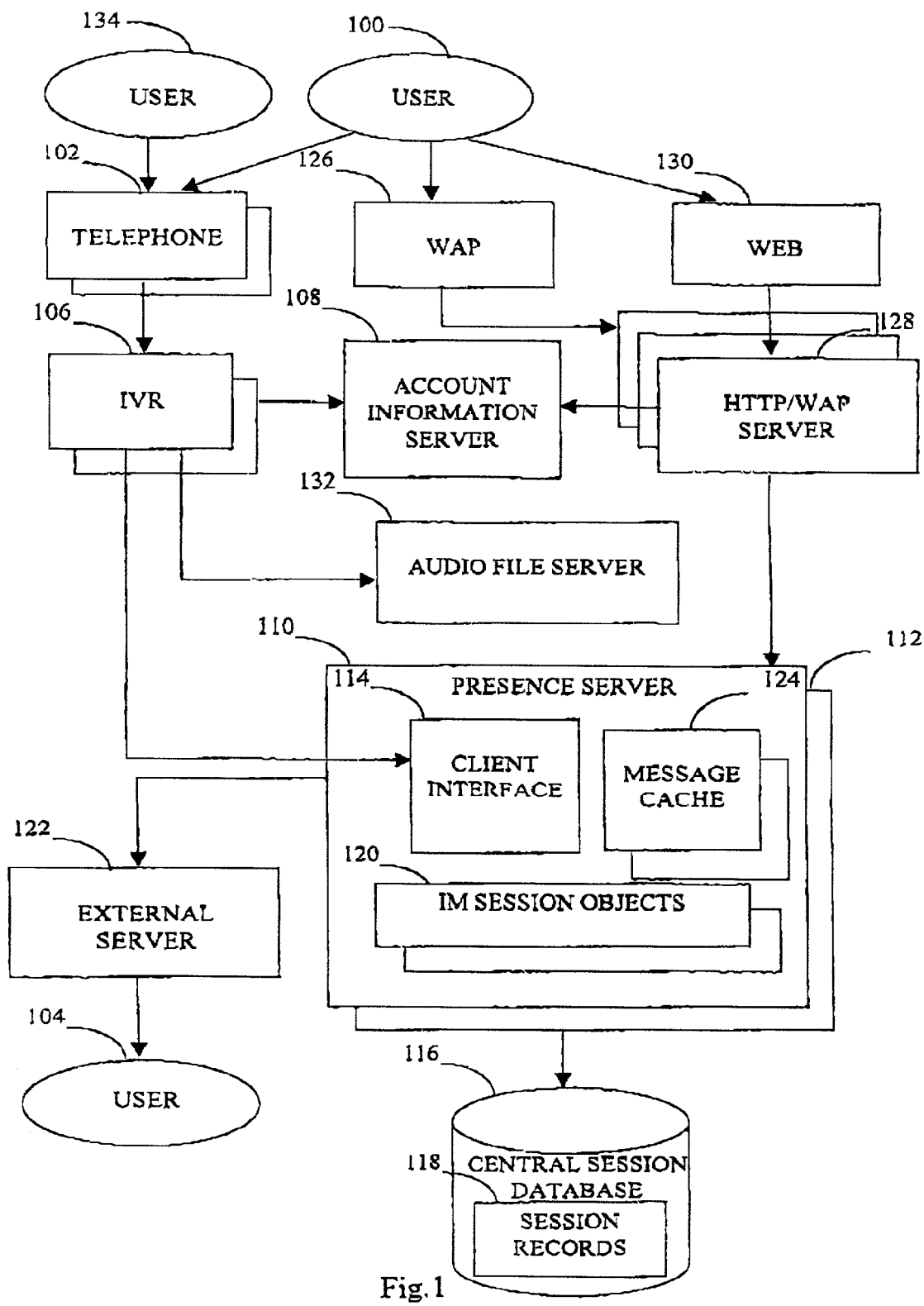
FIG. 1 is a simplified block diagram illustrating the structure and operation of a thin instant messaging proxy interface enabling persistent sessions, constructed and operative in accordance with a preferred embodiment of the present invention.
Figure 2:
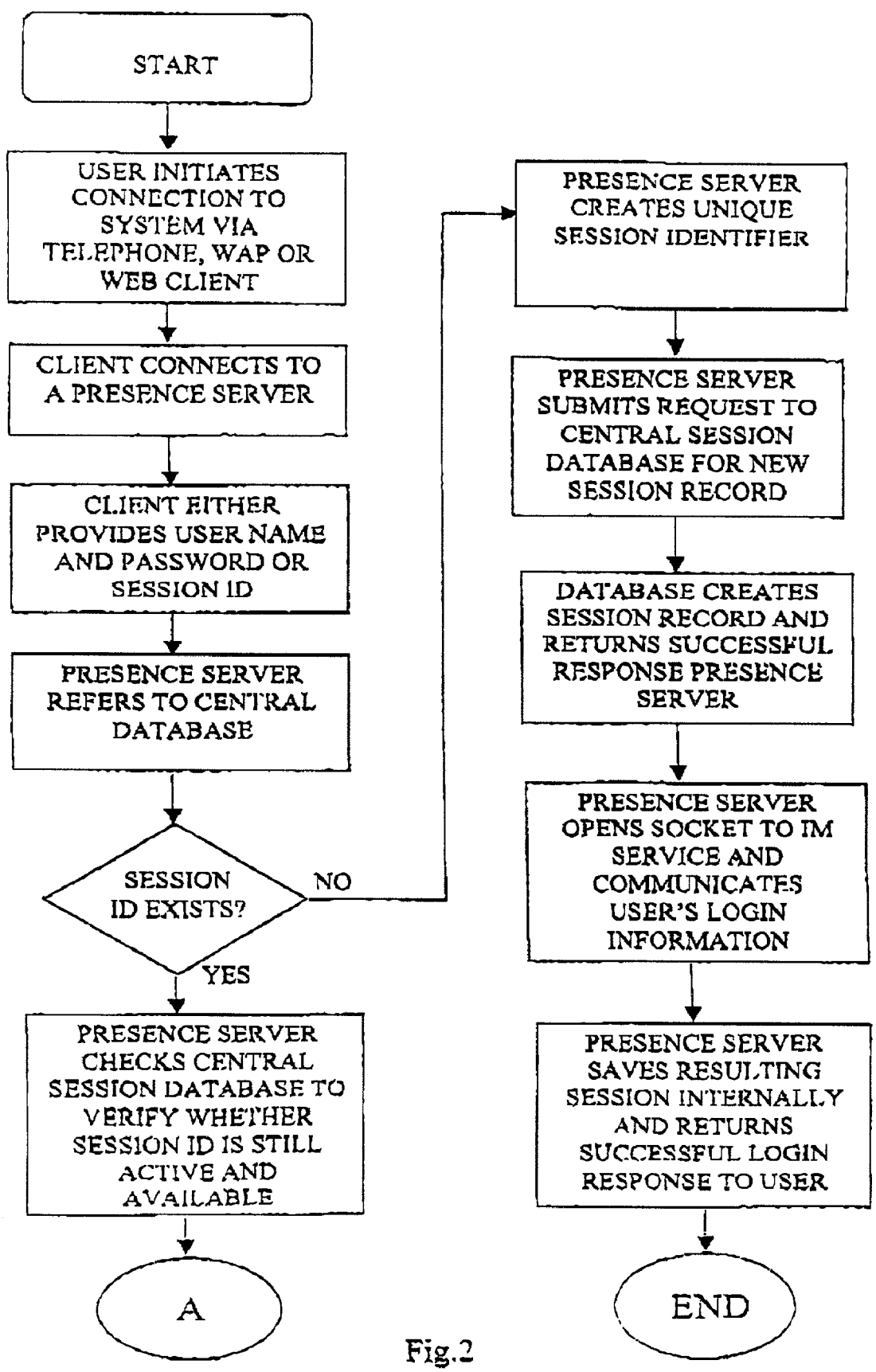
FIGS. 2 and 3 are simplified flowcharts illustrating the operation of creating an IM Session Object, in accordance with a preferred embodiment of the present invention.
Figure 3:
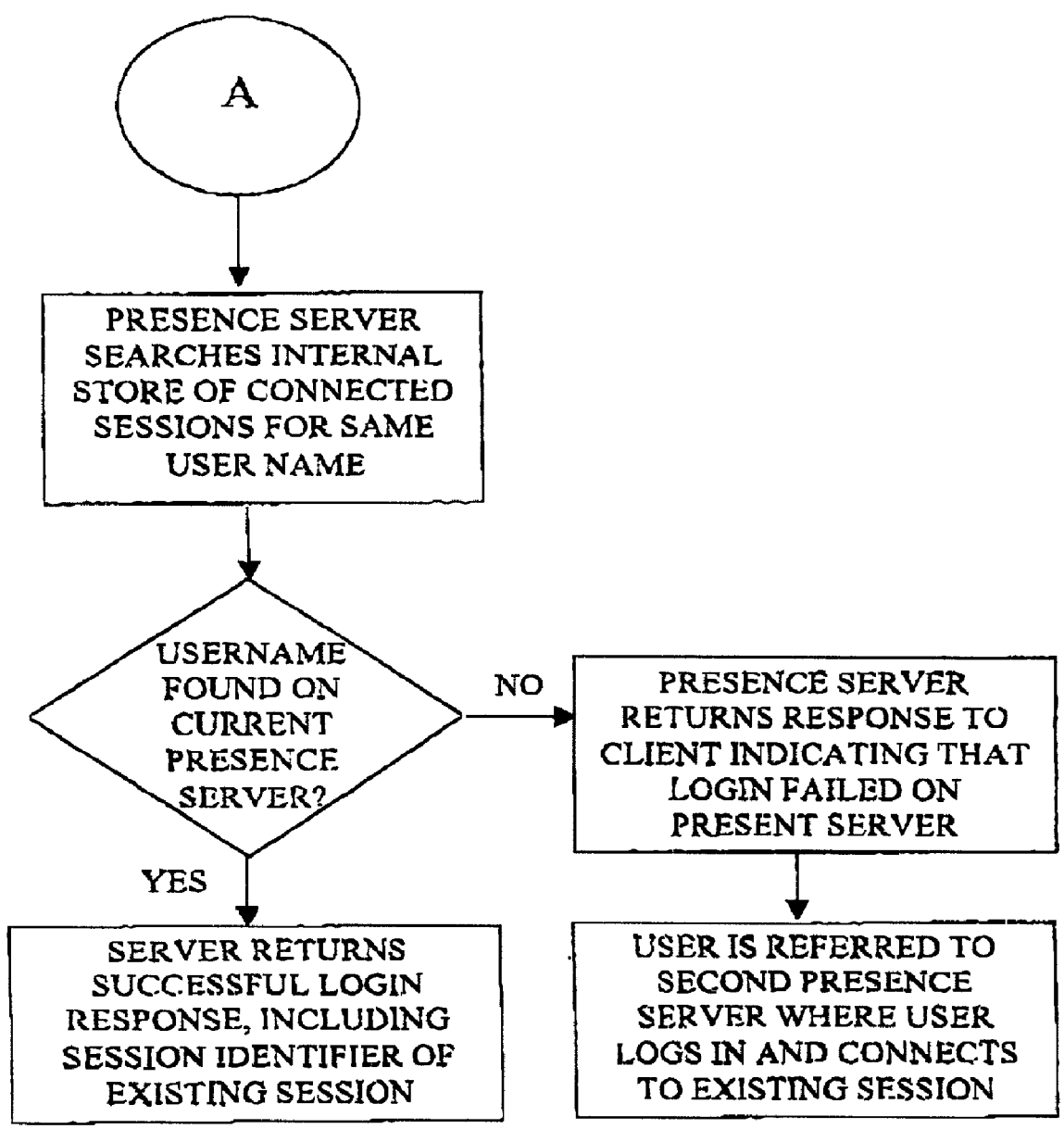

Reference is now made to FIG. 1, which is a simplified illustration of the system of the present invention when accessed through a client such as a telephone, WAP or Web client. Reference is also made to FIGS. 2 and 3, which are simplified flow charts, illustrating the process of creating an IM Session Object in accordance with a preferred embodiment of the present invention.

In one embodiment of the present invention, a User 100 may employ a Telephone 102 to communicate an IM message to a second IM User 104 via IM protocols. The User 100 may provide login information such as a username and password or a session ID, obtained from a previous session, via the Telephone 102 to an IVR 106. The IVR 106 may communicate the login information to an Account Information Server 108 to validate access to the system.

Next, the IVR 106 may connect to a Presence Server 110 through a Client Interface 114 and communicate the login information. It is a particular feature of the present invention that the IM protocol between the Presence Server 110 and the User 100 may be different from the IM protocol between the Presence Server 110 and the second User 104.

The IVR 106 may create a persistent socket connection to the Presence Server 110 for the duration of the phone call. The Presence Server 110 may connect to a Central Session Database 116 to verify whether a user has already logged in with the same login information. The Central Session Database 116 maintains a repository of references to active sessions, in a Session Records 118.

If the Central Session Database 116 reports that the login information for the User 100 is not listed in an existing IM Session Object 120, the Presence Server 110 may create a new IM Session Object 120, and submit a request to the Central Session Database 116 for a new Session Record 118 to reference the new IM Session Object 120. The Session Record 118 may contain the username, the session identifier and the IP address of the Presence Server 110.

Alternatively, if the Central Session Database 116 reports that the login information is listed in the Session Record 118, the Presence Server 110 may use the Central Session Database 116 to ascertain whether the Session Record 118 references a session on the same Presence Server 110. If the IP address of the Session Record 118 refers to the same Presence Server 110, the Presence Server 110 may search the internal store of IM Session Objects 120 for an IM Session Object 120 with the same login information.

If the IM Session Object 120 is not found, the Presence Server 110 may delete the Session Record 118 in the Central Session Database 116 and the Presence Server 110 may create a new IM Session Object 120 and register the session in the Central Session Database 116.

Next, the Presence Server 110 may open a socket to an IM service on an External Server 122 and the Presence Server 110 may communicate the login information of the User 100 to the External Server 122. If the login succeeds, the Presence Server 110 may save the resulting session information within the IM Session Object 120 for future reference.

Alternatively, if the Presence Server 110 finds the IM Session Object 120, no further login is required and the Presence Server 110 returns a successful login response, including a reference to the IM Session Object 120 of the existing session.

If the IP address of the Session Record 118 refers to a different Presence Server 112 than the current Presence Server 110 the IVR 106 is attempting to use, the Presence Server 110 may return a response indicating that the login attempt failed on that server. The Presence Server 110 may add a referral, such as an IMAP-style referral (see Request For Comment 2221 http://www.cis.ohio-state.edu/egi-bin/rfc/rfc2221.html), to the second Presence Server 112, where the User 100 may login and be connected to the existing IM Session Object 120.

Once the User 100 has successfully logged in, the User 100 may transmit messages to the second User 104 in the following manner. User 100 may compose a message and communicate the message to the IVR 106. The IVR 106 may communicate the message, with a reference to the IM Session Object 120, to the Presence Server 110. After retrieving the IM Session Object 120, the Presence Server 110 may transmit the message to the second User 104 via the External Server 122. It should be noted that the Presence Server 110 does not have to renegotiate a session with the External Server 122. It is a particular feature of the present invention that the Presence Server 110 may maintain an active session with the External Server 122, through an IM Session Object 120, even though the User 100 may have disconnected in the interim from the Presence Server 110.

Should the User 104 initiate a message, either in the form of a reply or as a new message, the message may be transmitted through the External Server 122 to the Presence Server 110. If the IM Session Object 120 of the User 100 is still connected to the External Server 122, the message may be received and deposited in a Message Cache 124 within the Presence Server 110. For each IM Session Object 120, there may be an associated Message Cache 124. Should subsequent interactions between the User 100 and the Presence Server 110 occur, all messages stored in the Message Cache 124 may be relayed.

In an alternative embodiment of the present invention, the User 100 employs a WAP-enabled telephone 126 to communicate with the second User 104. The User 100 wishing to communicate using instant messages may connect and communicate login information to a HTTP/WAP Server 128. The HTTP/WAP Server 128 may communicate the login information to the Account Information Server 108 to validate access to the system. The HTTP/WAP Server 128 may communicate the login information to the Presence Server 110. The Presence Server 110 may connect to the Central Session Database 116 to ascertain whether the User 100 has already logged in with the same login information. The remainder of the functionality may be similar to the manner previously described hereinabove.

In a further alternative embodiment of the present invention, the User 100 may employ a Web Browser 130 to communicate to a second User 104. The User 100 may communicate through the HTTP/WAP Server 128. The HTTP/WAP Server 128 may communicate the login information to the Account Information Server 108 to validate access to the system. The HTTP/WAP Server 128 may communicate the login information to the Presence Server 110. The Presence Server 110 may connect to the Central Session Database 116 to ascertain whether the User 100 has already logged in with the same login information. The remainder of the functionality may be similar to the manner previously described hereinabove.

The IVR 106 may also send links to voice messages through an Audio File Server 132. The IVR 106 may record a voice message received via the Telephone 102, which may then be transmitted to the Audio File Server 132. The Audio File Server 132 may encode the voice message into standard formats, such as WAV and REAL AUDIO®. The voice message may be stored on the Audio File Server 132 and the Audio File Server 132 may return a hyperlink to the voice message, which may be included in the instant message. The recipient of the instant message, User 104, may follow the included link to retrieve the voice message from the Audio File Server 132 and the voice message may be streamed or downloaded for listening.

If the User is another IVR/ELC Messenger system user, such as a User 134, the User 134 may hear the voice message directly through the IVR 106 via the Telephone 102.

It will be appreciated by persons skilled in the art that the present invention is not limited by what has been particularly shown and described hereinabove. Rather the present invention includes combinations and sub-combinations of the various features described hereinabove as well as modifications and extensions thereof, which would occur to a person skilled in the art and which do not fall within the prior art.

What is claimed is:

1. A method for instant messaging comprising:
    enabling a first instant messaging user, using a thin client device, to employ a presence server for initiating an active session on a communications channel between at least the first instant messaging user and a second instant messaging user;
    conducting text-based instant messaging on the communications channel between the first instant messaging user and the second instant messaging user;
    enabling the presence server to maintain the active session for the communications channel on behalf of the thin client device even though the thin client device is disconnected from the presence server; and
    after the thin client device has been at least temporarily disconnected from the presence server, enabling the first instant messaging user via the thin client device to utilize the communications channel again by reconnecting the thin client to the presence server via the active session.

2. A method as in claim 1 further comprising:
    employing use of an IVR (Interactive Voice Response) system to receive a message from the first instant messaging user for transmission over the communications channel to the second instant messaging user.

3. A method as in claim 2 further comprising:
    via at least partial use of the IVR system, recording an audio message initiated by the first instant messaging user from a telephone; and
    communicating a hyperlink to the audio message in a text-based instant message delivered to the second instant messaging user.

4. A method as in claim 2 further comprising:
    receiving a request from a third instant messaging user to connect to a communications channel associated with a previously active session associated with another presence server; and
    redirecting the third instant messaging user to the other communications channel associated with the previous session.

* * * * *